United States Patent
Hueber et al.

(10) Patent No.: US 10,382,098 B2
(45) Date of Patent: Aug. 13, 2019

(54) METHOD AND SYSTEM FOR OPERATING A COMMUNICATIONS DEVICE THAT COMMUNICATES VIA INDUCTIVE COUPLING

(71) Applicant: NXP B.V., Eindhoven (NL)

(72) Inventors: Gernot Hueber, Linz (AT); Ian Thomas Macnamara, Graz (AT); Jingfeng Ding, Gratwein (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/715,044

(22) Filed: Sep. 25, 2017

(65) Prior Publication Data

US 2019/0097688 A1 Mar. 28, 2019

(51) Int. Cl.
*H01Q 21/30* (2006.01)
*H01Q 5/50* (2015.01)
*H04B 5/00* (2006.01)

(52) U.S. Cl.
CPC ......... *H04B 5/0075* (2013.01); *H04B 5/0031* (2013.01); *H04B 5/0081* (2013.01)

(58) Field of Classification Search
CPC .................................................. H04B 5/0075
See application file for complete search history.

(56) References Cited

U.S. PATENT DOCUMENTS

| | | | |
|---|---|---|---|
| 5,703,573 A | 12/1997 | Fujimoto et al. | |
| 6,760,434 B1 * | 7/2004 | Rezvani | H04L 5/143 379/390.04 |
| 6,799,015 B1 | 9/2004 | Tiwari | |
| 7,200,375 B2 * | 4/2007 | Kottschlag | H04B 7/0842 343/853 |
| 7,268,644 B2 * | 9/2007 | Kottschlag | H01Q 21/30 333/100 |
| 7,295,594 B1 | 11/2007 | Lohr | |
| 7,577,205 B1 * | 8/2009 | Liu | H04B 3/30 375/258 |
| 8,013,600 B1 | 9/2011 | Yepez, III et al. | |

(Continued)

FOREIGN PATENT DOCUMENTS

| | | |
|---|---|---|
| EP | 2 395 673 A2 | 12/2011 |
| EP | 2 752 999 A1 | 9/2014 |

(Continued)

OTHER PUBLICATIONS

E. Sartori, "Hybrid Transformers," IEEE Transactions on Parts, Materials and Packaging, vol. PMP-4, No. 3, Sep. 1968.

(Continued)

*Primary Examiner* — Cindy Trandai

(57) ABSTRACT

Embodiments of methods and systems for operating a communications device that communicates via inductive coupling are described. In an embodiment, a method for operating a communications device that communicates via inductive coupling involves detecting a system condition associated with the communications device and tuning a matching network of the communications device in response to the system condition, where the matching network includes a hybrid transformer that separates a receiver of the communications device from a transmitter of the communications device. Other embodiments are also described.

10 Claims, 11 Drawing Sheets

(56) References Cited

U.S. PATENT DOCUMENTS

| | | | |
|---|---|---|---|
| 8,279,018 B1* | 10/2012 | Song | H03F 1/565 |
| | | | 333/132 |
| 8,817,184 B1 | 8/2014 | Amirkhany et al. | |
| 8,964,605 B1* | 2/2015 | Ansari | H03H 7/42 |
| | | | 370/278 |
| 9,083,441 B2* | 7/2015 | Sahota | H04B 1/581 |
| 9,293,797 B2* | 3/2016 | Kim | H03K 17/693 |
| 9,727,812 B2 | 8/2017 | Forster | |
| 9,960,735 B1 | 5/2018 | Ding et al. | |
| 9,985,732 B2 | 5/2018 | Cordier | |
| 2002/0097144 A1 | 7/2002 | Collins et al. | |
| 2004/0135622 A1 | 7/2004 | Masleid et al. | |
| 2004/0174185 A1 | 9/2004 | Lin et al. | |
| 2005/0232300 A1* | 10/2005 | Stiscia | H04L 27/0002 |
| | | | 370/463 |
| 2005/0259764 A1 | 11/2005 | Hung Lai et al. | |
| 2006/0132362 A1* | 6/2006 | Yuanzhu | H01Q 1/36 |
| | | | 343/700 MS |
| 2007/0293168 A1* | 12/2007 | Kottschlag | H01Q 1/242 |
| | | | 455/132 |
| 2008/0186105 A1* | 8/2008 | Scuderi | H03H 7/40 |
| | | | 333/17.3 |
| 2010/0273441 A1 | 10/2010 | Dubash et al. | |
| 2011/0065398 A1 | 3/2011 | Liu et al. | |
| 2011/0068636 A1* | 3/2011 | Lee | H03K 17/693 |
| | | | 307/115 |
| 2011/0300800 A1 | 12/2011 | Wuidart | |
| 2012/0056718 A1 | 3/2012 | Leutgeb et al. | |
| 2012/0092901 A1 | 4/2012 | Wuidart | |
| 2012/0094610 A1 | 4/2012 | Lunden et al. | |
| 2012/0122461 A1 | 5/2012 | Hossain et al. | |
| 2012/0152938 A1 | 6/2012 | Nordh et al. | |
| 2012/0153732 A1 | 6/2012 | Kurs et al. | |
| 2012/0153835 A1* | 6/2012 | Su | H05B 33/0815 |
| | | | 315/127 |
| 2013/0258911 A1* | 10/2013 | Choksi | H03H 7/09 |
| | | | 370/277 |
| 2013/0271342 A1 | 10/2013 | Shen | |
| 2013/0328734 A1 | 12/2013 | Thind | |
| 2014/0044293 A1 | 2/2014 | Ganem et al. | |
| 2014/0050124 A1* | 2/2014 | Yang | H04B 1/10 |
| | | | 370/278 |
| 2014/0073243 A1* | 3/2014 | Hijioka | H04B 5/0031 |
| | | | 455/41.1 |
| 2014/0080409 A1 | 3/2014 | Frankland et al. | |
| 2014/0101747 A1 | 4/2014 | Lu et al. | |
| 2014/0111023 A1* | 4/2014 | Kagami | B60L 11/182 |
| | | | 307/104 |
| 2014/0240057 A1 | 8/2014 | Low et al. | |
| 2014/0241556 A1* | 8/2014 | Larsen | H04L 27/14 |
| | | | 381/316 |
| 2014/0306780 A1* | 10/2014 | Lehtinen | H03H 7/463 |
| | | | 333/131 |
| 2015/0022145 A1 | 1/2015 | Kim et al. | |
| 2015/0054453 A1 | 2/2015 | White, II et al. | |
| 2015/0061404 A1 | 3/2015 | Lamenza et al. | |
| 2015/0065065 A1* | 3/2015 | Rofougaran | H04L 5/14 |
| | | | 455/78 |
| 2015/0079903 A1 | 3/2015 | Song et al. | |
| 2015/0171919 A1 | 6/2015 | Ballantyne et al. | |
| 2015/0215937 A1* | 7/2015 | Khandani | H04W 76/10 |
| | | | 370/277 |
| 2015/0270876 A1* | 9/2015 | Kim | H04B 5/0081 |
| | | | 455/41.1 |
| 2015/0280443 A1 | 10/2015 | Vladan et al. | |
| 2015/0280444 A1 | 10/2015 | Smith et al. | |
| 2015/0303997 A1 | 10/2015 | Dhayni | |
| 2016/0100312 A1 | 4/2016 | Bell et al. | |
| 2016/0112146 A1* | 4/2016 | Lau | H04B 15/06 |
| | | | 455/323 |
| 2016/0142109 A1 | 5/2016 | Kumar et al. | |
| 2016/0172890 A1 | 6/2016 | Jeong | |
| 2016/0174267 A1 | 6/2016 | Mofidi et al. | |
| 2016/0197510 A1 | 7/2016 | Stommer et al. | |
| 2016/0294227 A1 | 10/2016 | Podkamien et al. | |
| 2016/0365737 A1 | 12/2016 | Vladan | |
| 2017/0001003 A1* | 1/2017 | Pivonka | A61B 5/6871 |
| 2017/0005533 A1 | 1/2017 | Zeine et al. | |
| 2017/0012590 A1 | 1/2017 | Fong et al. | |
| 2017/0093168 A1 | 3/2017 | Von Novak, III et al. | |
| 2017/0104468 A1 | 4/2017 | Kormann et al. | |
| 2017/0110796 A1 | 4/2017 | Rokhsaz et al. | |
| 2017/0141620 A1 | 5/2017 | Zeine et al. | |
| 2017/0205481 A1 | 7/2017 | Kim et al. | |
| 2017/0230204 A1* | 8/2017 | Sivertsen | H04L 25/0276 |
| 2017/0264322 A1* | 9/2017 | Greene | H04B 1/18 |
| 2017/0270323 A1 | 9/2017 | Butler et al. | |
| 2017/0373541 A1 | 12/2017 | Shimokawa et al. | |
| 2018/0040953 A1 | 2/2018 | Gebhart et al. | |
| 2018/0054086 A1 | 2/2018 | Jung | |
| 2018/0102151 A1 | 4/2018 | Kim et al. | |
| 2018/0176711 A1 | 6/2018 | Hueber et al. | |
| 2018/0176712 A1 | 6/2018 | Hueber et al. | |
| 2019/0097687 A1 | 3/2019 | Hueber et al. | |

FOREIGN PATENT DOCUMENTS

| | | |
|---|---|---|
| EP | 2988427 A1 | 2/2016 |
| EP | 3156935 A1 | 4/2017 |
| WO | 2009/015115 A1 | 1/2009 |

OTHER PUBLICATIONS

S. Abdelhalem, et al., "Hybrid Transformer-Based Tuneable Differential Duplexer in a 90-nm CMOS Process", IEEE Transactions on Microwave Theory and Techniques, vol. 61, No. 3, Mar. 2013.

European Search Report, 17198699, dated Apr. 26, 2018.

European Search Report, 17199033.6, dated May 3, 2018.

Office action for related U.S. Appl. No. 15/383,382 (dated May 23, 2017).

Office action for related U.S. Appl. No. 15/383,382 (dated Oct. 20, 2017).

Office action for related U.S. Appl. No. 15/383,382 (dated Apr. 13, 2018).

Office action for related U.S. Appl. No. 15/383,382 (dated Oct. 9, 2018).

Office action for related U.S. Appl. No. 15/383,406 (dated Nov. 17, 2017).

Office action for related U.S. Appl. No. 15/383,406 (dated May 23, 2018).

Office action for related U.S. Appl. No. 15/383,406 (dated Sep. 5, 2018).

Office action for related U.S. Appl. No. 15/383,406 dated (dated Feb. 13, 2019).

"Circulators and Isolators, unique passive devices—Application Note—AN98035", Philips Semiconductors, 31 pgs., retrieved from the internet Mar. 19, 2019 at: http://f6csx.free.fr/techni/CIRCU/Circulateurs2.pdf (Mar. 1998).

Langwieser, R. et al. "A Modular UHF Reader Frontend for a Flexible RFID Testbed", Institute of Communications and Radio-Frequency Engineering, Vienna University of Technology, 12 pgs, retrieved from the internet Mar. 19, 2019 at: https://www.eurasip.org/Proceedings/Ext/RFID2008/modular_UHF.pdf. (2008).

Reiskarimian, N. et al. "Magnetic-free non-reciprocity based on staggered commutation", Nature Communications, 10 pgs., retrieved from the internet Mar. 19, 2019 at: https://www.nature.com/articles/ncomms11217.pdf (Apr. 2016).

Non-final Office Action for U.S. Appl. No. 15/715,027 dated Jun. 14, 2018, 13 pages.

Final Office Action for U.S. Appl. No. 15/715,027 dated Jan. 9, 2019, 11 pages.

Non-Final Office Action for U.S. Appl. No. 15/715,027 dated Jun. 11, 2019, 12 pages.

\* cited by examiner

METHOD AND SYSTEM FOR OPERATING A COMMUNICATIONS DEVICE THAT COMMUNICATES VIA INDUCTIVE COUPLING

Communications devices can communicate with each other via inductive coupling. For example, near field communications (NFC) is a wireless technology based on radio frequency identification (RFID). NFC defines a wireless connection between two devices in close proximity to each other to exchange data between the two devices. For example, the data communications between a reader and a transponder typically are bi-directional and initialed by the reader, which generates a continuous magnetic field. RFID devices that utilize NFC typically can be configured for either passive load modulation (PLM) or active load modulation (ALM).

In a communications device that communicates via inductive coupling, the receiver sensitivity of the communications device, which is the lowest power level at which the receiver of the communications device can detect an RF signal and demodulate data, can affect the performance of the communications device. For example, improving the receiver sensitivity of a communications device that communicates via inductive coupling can allow the receiver of the communications device to detect weaker signals, and, consequently, increase the transmission range of the communications device and/or reduce the power consumption of the communications device.

SUMMARY

Embodiments of methods and systems for operating a communications device that communicates via inductive coupling are described. In an embodiment, a method for operating a communications device that communicates via inductive coupling involves detecting a system condition associated with the communications device and tuning a matching network of the communications device in response to the system condition, where the matching network includes a hybrid transformer that separates a receiver of the communications device from a transmitter of the communications device. Other embodiments are also described.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
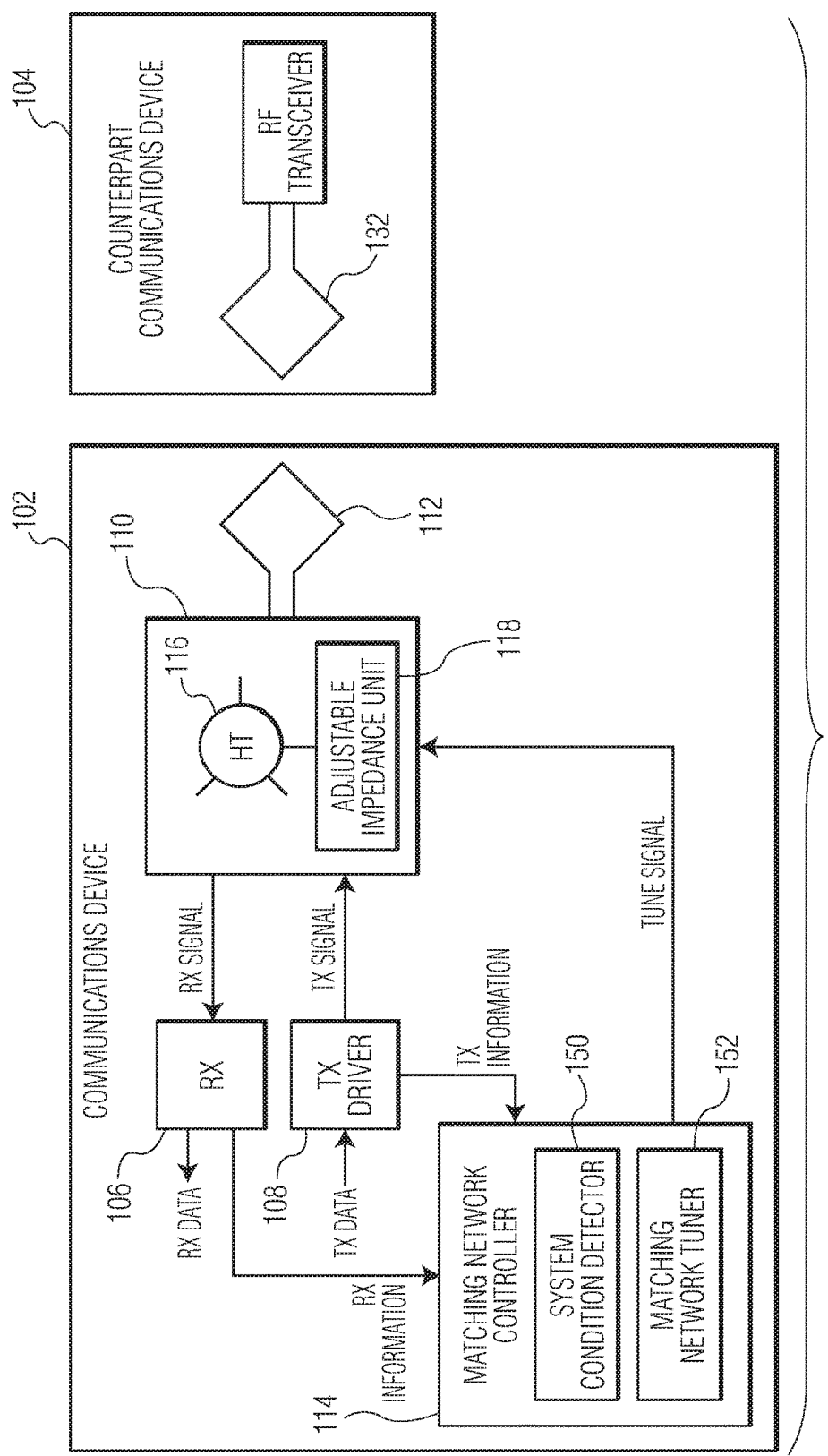
FIG. 1 depicts an embodiment of a communications device that can be used with a counterpart communications device to form an inductively coupled communications system.

FIG. 1 depicts an embodiment of a communications device 102 that can be used with a counterpart communications device 104 to form an inductively coupled communications system 100. In the inductively coupled communications system depicted in FIG. 1, the communications device 102 communicates with the counterpart communications device 104 via inductive coupling. In some embodiments, the communications device 102 is a card/transponder device or the communications device 102 is in a "card-mode" and the counterpart communications device 104 is a dedicated reader device or a communications device in "reader-mode." In some other embodiments, the communications device 102 is a reader device or the communications device is in a reader mode and the counterpart communications device 104 is a dedicated card device or a communications device in card-mode.

In the embodiment depicted in FIG. 1, the communications device 102 includes an analog receiver 106, an analog transmitter driver 108, a matching network 110 that is coupled to an antenna 112, and a matching network controller 114. In an example operation of the communications device, an RF signal (e.g., an RX signal) is received by the antenna via inductive coupling from an antenna 132 of the counterpart communications device 104 and is passed to the analog receiver to convert the RF signal into a digital signal (e.g., RX data). A signal (e.g., TX data) may be generated in response to the RF signal and is used to produce an outgoing RF signal (e.g., a TX signal) at the analog transmitter driver, which is transmitted to the counterpart communications device via inductive coupling using the antenna. The antenna may be an induction type antenna such as a loop antenna. The communications device 102 may be an integrated circuit (IC) device. In some embodiments, the communications device 102 is implemented in a handheld computing system or a mobile computing system, such as a mobile phone. The communications device 102 may be a near field communications (NFC) device that utilizes inductive coupling to communicate. In some embodiments, the communications device 102 is implemented as an RF transponder compatible with the International Organization for Standardization (ISO)/the International Electrotechnical Commission (IEC) 14443 standard. Although the illustrated communications device 102 is shown with certain components and described with certain functionality herein, other embodiments of the communications device 102 may include fewer or more components to implement the same, less, or more functionality. In some embodiments, the communications device 102 is an active load modulation (ALM) device. In such embodiments, the communications device 102 can be configured to generate its own magnetic field for transmitting an outgoing RF signal using a current source, such as a battery, which results in greater communications distances compared to passive load modulation (PLM) systems.

In the embodiment depicted in FIG. 1, the counterpart communications device 104 includes the antenna 132 and an RF transceiver 134 configured to receive incoming RF signals from the antenna 132 and to transmit outgoing RF signals through the antenna 132. In some embodiment, the RF transceiver includes an analog transmitter driver, a matching network, and/or an analog transmitter driver that are similar to or the same as the analog transmitter driver 108, the matching network 110, and/or the analog transmitter driver 108 of the communications device 102.

The receiver sensitivity of the communications device 102, which is the lowest power level at which the analog receiver 106 of the communications device can detect an RF signal and demodulate data, can affect the performance of the communications device. For example, improving the receiver sensitivity of the communications device can allow the analog receiver of the communications device to detect weaker signals, and, consequently, increase the transmission range of the communications device and/or reduce the power consumption of the communications device. In the communications device depicted in FIG. 1, the analog transmitter driver 108 can cause signal interference with the reception of an RF signal at the analog receiver. In the communications device 102 depicted in FIG. 1, the matching network 110 includes a hybrid transformer 116 that separates the analog receiver 106 of the communications device from the analog transmitter driver 108 of the communications device. For example, the analog receiver and the analog transmitter driver are connected to different ports of the hybrid transformer. Because the analog receiver is separated from the analog transmitter driver by the hybrid transformer, signal isolation between the analog transmitter driver and the analog receiver is improved. Consequently, the transmitter carrier interference with the reception of an RF signal at the analog receiver can be attenuated. In a matching network that does not provide signal isolation between the transmitter and the antenna, the transmitter power has to be limited, which in turn limits the achievable communication distance. However, because of the signal isolation between the analog transmitter driver and the analog receiver, more transmitter power (e.g., full power) can be used with the matching network while still maintaining an adequate receiver sensitivity at the analog receiver. Consequently, compared to a matching network that does not provide signal isolation between the transmitter and the antenna, the matching network in FIG. 1 allows more transmitter power (e.g., full power) to be used, which results in greater communications distance and/or reduce the power consumption of the communications device. In addition, compared to a typical duplexer such as a transmit/receive (TR) switch, the hybrid transformer can provide good isolation of the analog receiver from the analog transmitter driver at lower insertion loss and lower circuit area requirement than the typical duplexer. In some embodiments, the hybrid transformer 116 maintains an impedance match at its input/output ports to maintain an adequate isolation between the analog transmitter driver 108 and the analog receiver 106 as well as keeping the insertion loss from the antenna 112 to the analog receiver or from the analog transmitter driver to the antenna within an acceptable range.

The matching network controller 114 of the communications device 102 is configured to control the matching network 110. The matching network controller can control one or more characteristics of the matching network and/or one or more components within the matching network. In some embodiments, the matching network controller is configured to control an impedance configuration of the matching network. In an embodiment, the matching network includes an adjustable impedance unit 118, which is connected to the hybrid transformer 116. The adjustable impedance unit may be used to compensate for a mismatch of impedance at the hybrid transformer. In an embodiment, the matching network controller controls the adjustable impedance unit based on receiver (RX) information from the analog receiver 106 and/or based on transmitter (TX) information from the analog transmitter driver 108. In some embodiments, the matching network controller dynamically adjusts the adjustable impedance unit based on an instantaneous coupling condition between the communications device and the counterpart communications device 104. The matching network controller may be implemented as firmware, hardware and a combination of software, firmware, and/or hardware. In some embodiments, the matching network controller includes at least one processor, for example, a microprocessor. In some embodiments, the matching network controller detects a coupling condition between the communications device and the counterpart communications device based on one or more system parameters of the communications device. In some embodiments, the matching network controller includes at least one sensor, for example, a voltage sensor or a current sensor. In some embodiments, the matching network controller obtains transmission output power information related to the communications device. The transmission output power information can be used to derive a coupling condition related to the communications device. The transmission output power information may include a transmitter voltage within the communications device and/or a transmitter current within the communications device. The matching network controller may also obtain a received signal strength indicator (RSSI) configured to measure the signal amplitude of the received RF signal at the communications device to generate an RSSI. The RSSI can be used to derive a coupling condition related to the communications device. For example, the transmitter current at the analog transmitter driver of the communications device, the signal magnitude of a signal received at the analog receiver of the communications device, and/or the phase information of a signal received at the analog receiver of the communications device can be obtained by the matching network controller to derive the a coupling condition between the communications device and the counterpart communications device.

In some embodiments, the matching network controller 114 includes a system condition detector 150 configured to detect a system condition associated with the communications device and a matching network tuner 152 configured to tune the matching network 110 in response to the coupling condition. The matching network tuner can tune one or more characteristics of the matching network and/or one or more components within the matching network in response to the system condition. In an embodiment, the matching network tuner is configured to tune an adjustable impedance (e.g., the adjustable impedance unit 118) connected to the hybrid transformer 116 in response to the system condition. The matching network tuner may be further configured to tune the adjustable impedance to compensate for a mismatch of impedance at the hybrid transformer in response to the system condition. The matching network tuner can tune the adjustable impedance in discrete steps (e.g., between a limited number of impedance values) or continuously (e.g., adjustable to every impedance value between an impedance value range) in response to the system condition. In some embodiments, the matching network tuner is further configured to control s semiconductor device in response to the system condition. Each of the adjustable impedance, the receiver, the transmitter, and an antenna of the communications device may be connected to a port of the hybrid transformer. The coupling condition associated with the communications device may include a coupling condition associated with the communications device. In some embodiments, the system condition detector is further configured to obtain one or more system parameters associated with the communications device and to derive the coupling condition associated with the communications device from the one or more system parameters. In these embodiments, the one or more system parameters may include at least one of a transmitter current at an analog transmitter driver of the communications device, a signal magnitude of a signal received at an analog receiver of the communications device, and phase information of a signal received at an analog receiver of the communications device.

Figure 2:
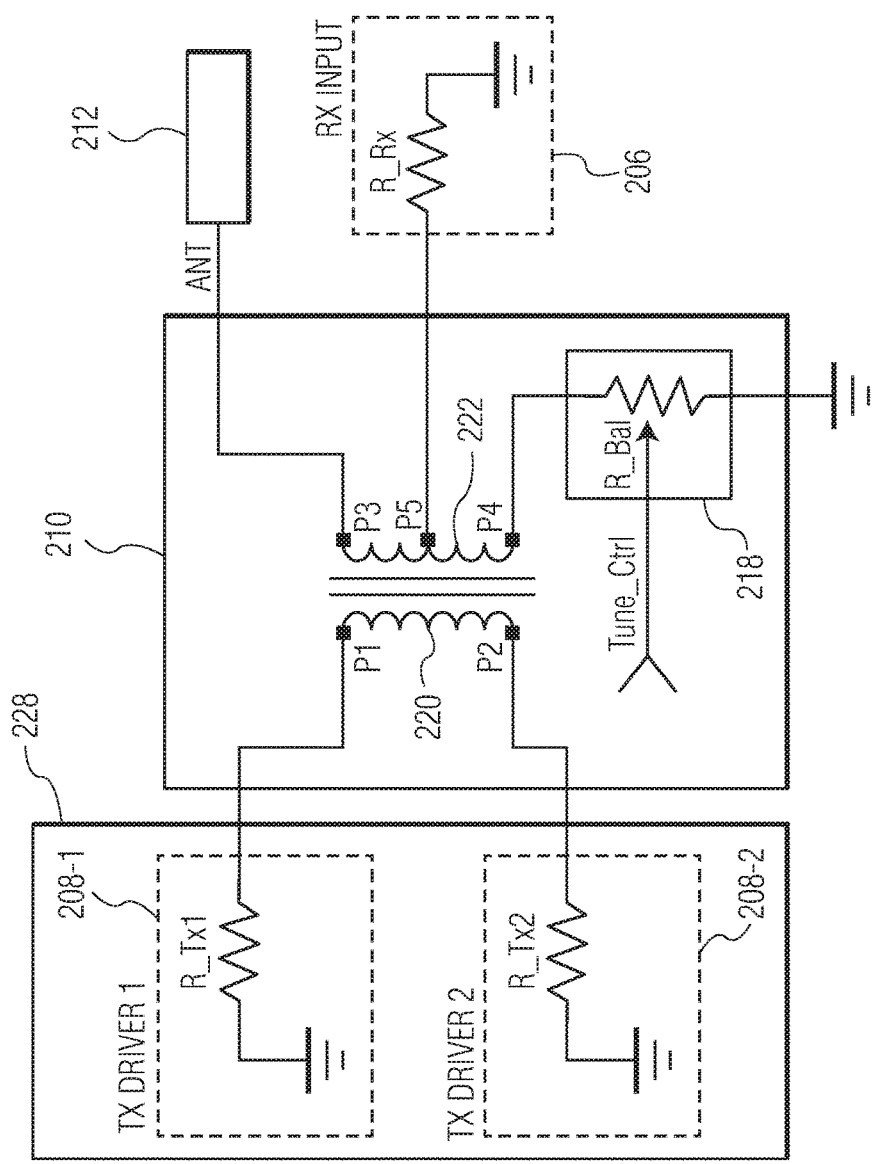
FIG. 2 depicts an embodiment of a matching network that can be used with a matching network controller of the communications device of FIG. 1 and a differential transmitter driver circuit of the communications device.

FIG. 2 depicts an embodiment of a matching network 210 that can be used with the matching network controller 114 of the communications device 102 of FIG. 1 and a differential transmitter driver circuit 228 of the communications device. In the embodiment depicted in FIG. 2, the matching network includes a hybrid transformer 216 that includes a primary coil or winding 220 and a secondary coil or winding 222 that have five ports or terminals, "P1," "P2," "P3," "P4," and "P5." The differential transmitter driver circuit, which includes analog transmitter drivers 208-1 and 208-2, is connected to the primary coil of the hybrid transformer. Specially, the analog transmitter driver 208-1, which is represented by a resistor, "R_Tx1," is connected to the port, P1, of the hybrid transformer. The analog transmitter driver 208-2, which is represented by a resistor, "R_Tx2," is connected to the port, P2, of the hybrid transformer. A single-ended antenna 212, an analog receiver 206, and an adjustable impedance unit 218 are connected to the secondary coil of the hybrid transformer. Specially, the single-ended antenna is connected to the port, P3, of the hybrid transformer. In some embodiments, instead of the single-ended antenna, a differential antenna may be used with the matching network, for example, by connecting to the ports, P3 and P4, of the matching network. The analog receiver, which is represented by a resistor, "R_Rx," is connected to the port, P5, of the hybrid transformer. In some embodiments, the port, P5, is the center tap of the secondary coil to maximize isolation from the analog transmitter drivers 208-1 and 208-2 to the analog receiver 206. In other embodiments, the port, P5, is not the center tap of the secondary coil, which can be used to optimize the gain between the antenna and the analog receiver 206. Due to the high output power created by the analog transmitter drivers, the Rx signal can be interfered by signals from the analog transmitter drivers. In a matching network that does not provide signal isolation between the transmitter and the antenna, the transmitter power has to be limited, which in turn limits the achievable communication distance. In the embodiment depicted in FIG. 2, the hybrid transformer separates the analog receiver 206 of the communications device from the analog transmitter drivers 208-1 and 208-2 of the communications device because the analog receiver and the analog transmitter drivers are connected to different ports of the hybrid transformer. Because the analog receiver is separated from the analog transmitter drivers by the hybrid transformer, signal isolation between the analog transmitter drivers and the analog receiver is improved. Consequently, the transmitter carrier interference with the reception of an RF signal at the analog receiver can be attenuated. Because of the signal isolation between the analog transmitter drivers and the analog receiver, more transmitter power (e.g., full power) can be used with the matching network while still maintaining an adequate receiver sensitivity at the analog receiver. Consequently, compared to a matching network that does not provide signal isolation between the transmitter and the antenna, the matching network in FIG. 2 allows more transmitter power (e.g., full power) to be used, which can provide greater communications distance. The adjustable impedance unit, which is represented by an adjustable resistor, "R_Bal," is connected to the port, P4, of the hybrid transformer, and is controlled by a tuning control signal, Tune_Ctrl, from the matching network controller 114 (depicted in FIG. 1). In an example operation of the matching network, the hybrid transformer attenuates the signal path from the analog transmitter drivers 208-1 and 208-2 to the analog receiver while the path from the single-ended antenna 212 to the analog receiver 206 is not affected.

The matching network 210 depicted in FIG. 2 is one possible embodiment of the matching network 110 depicted in FIG. 1. However, the matching network depicted in FIG. 1 is not limited to the embodiment shown in FIG. 2. For example, although the adjustable impedance unit 218 is implemented as the adjustable resistor, R_Bal, in the embodiment depicted in FIG. 2, in other embodiments, the adjustable impedance unit is implemented as a combination of a resistive unit and a capacitive unit that exhibits a complex impedance. In another example, instead of the differential transmitter driver circuit 228, which includes the analog transmitter drivers 208-1 and 208-2, a single-ended transmitter driver is connected to the primary coil 220 of the hybrid transformer 216.

Figure 3:
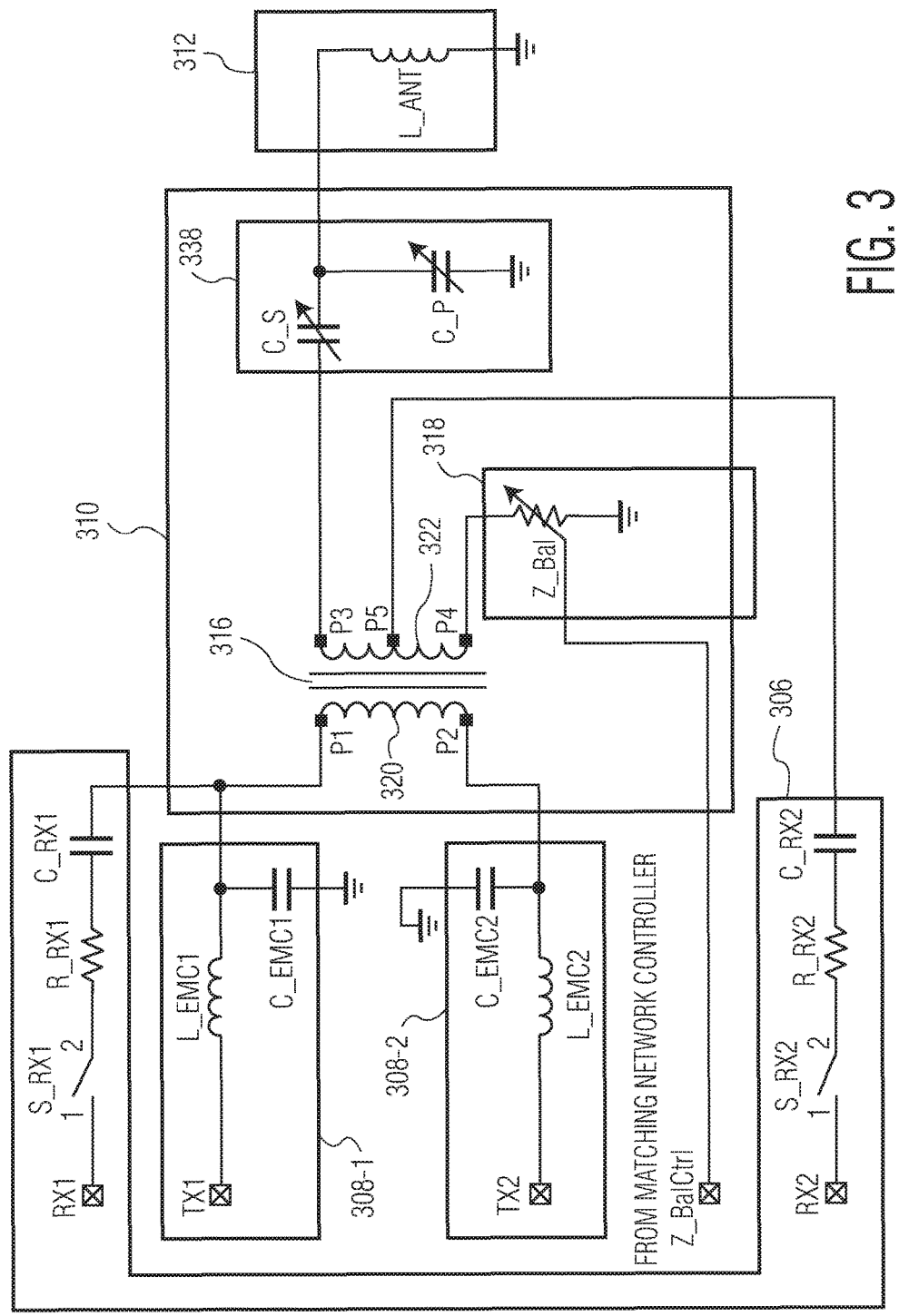
FIG. 3 depicts another embodiment of a matching network that can be used with the matching network controller of the communications device of FIG. 1.

FIG. 3 depicts another embodiment of a matching network 310 that can be used with the matching network controller 114 of the communications device 102 of FIG. 1. In the embodiment depicted in FIG. 3, the matching network includes a hybrid transformer 316 that includes a primary coil 320 and a secondary coil 322 that have five ports or terminals, "P1," "P2," "P3," "P4," and "P5." The matching network allows single-ended and differential transmitter operations as well as single-ended and differential receiver operations. A differential transmitter driver circuit 328 with EMC filtering, which includes analog transmitter drivers 308-1 and 308-2, is connected to the primary coil of the hybrid transformer. Specially, the analog transmitter driver 308-1, which is represented by a combination of an inductor, "L1_EMC," and a capacitor, "C1_EMC," is connected to the port, P1, of the hybrid transformer and a terminal, "TX1." The analog transmitter driver 308-2, which is represented by a combination of an inductor, "L2_EMC," and a capacitor, "C2_EMC," is connected to the port, P2, of the hybrid transformer and a terminal, "TX2." A single-ended antenna 312 and an adjustable impedance unit 318 are connected to the secondary coil of the hybrid transformer. Specially, the single-ended antenna, which is represented by an inductor, "L_ANT," is connected to the port, P3, of the hybrid transformer via a capacitive divider 338 of the matching network. The capacitive divider includes adjustable capacitors, "C_S," and, "C_P," whose capacitance values can be adjusted by the matching network controller 114 (depicted in FIG. 1), for example, to compensate impedance mismatch due to the coupling condition between the communications device 102 and the counterpart communications device 104. The adjustable impedance unit, which is represented by an adjustable impedance, "Z_Bal," is connected to the port, P4, of the hybrid transformer, and is controlled by the matching network controller 114 (depicted in FIG. 1) (e.g., controlled by a tuning control signal, Z_BalCtrl, from the matching network controller). In some embodiments, the tunable impedance Z_Bal is used to ensure balance of the hybrid transformer such that the isolation from the analog transmitter drivers 308-1, 308-2 to Rx is maximized and the attenuation from the antenna to the analog receiver and from the analog transmitter drivers 308-1, 308-2 to the antenna is minimized. In some embodiments, one or multiple tunable devices (e.g., capacitors) are used to tune the impedance of the matching network while the impedance of the tunable impedance Z_Bal can be tuned in a continuous manner. In some embodiments, one or multiple tunable devices (e.g., capacitors) may be to tune the impedance of the matching network where the impedance of the tunable impedance Z_Bal can be tuned in discrete steps. The tunable devices may be equally sized or binary weighted.

In the embodiment depicted in FIG. 3, there are two separate connections from the hybrid transformer 316 to an analog receiver 306. A terminal, "RX1," is connected to the "high-gain" receive path from the hybrid transformer output via DC-coupling and an input resistor "R_RX1," to the receiver input, which may be switched off using the switch, "S_RX1." A terminal, "RX2," is connected to the "isolated" receive path from the port, P5, output via DC-coupling and an input resistor, "R_RX2," to the receiver input RX2, which may be switched off using the switch, S_RX2, which is isolated by the hybrid transformer from the transmitter carrier signal. In some embodiments, the port, P5, is the center tap of the secondary coil to maximize isolation from the analog transmitter drivers 308-1 and 308-2 to the analog receiver 306. In other embodiments, the port, P5, is not the center tap of the secondary coil, which can be used to optimize the gain between the antenna and the analog receiver 306.

The analog receiver may be used in different operation modes, which include a high-gain operation mode in which no isolation by enabling the switch, S_RX1, and opening/closing the switch, S_RX2, a high isolation and lower gain operation mode by enabling the switch, S_RX2, and opening the switch, S_RX1, and a hybrid operation mode by enabling both switches, S_RX1, and S_RX2. In some embodiment, the Rx path resistances R_RX1, R_RX2 may be chosen differently to optimize the gain for the respective paths and to compensate signal loss in the hybrid transformer. In an example operation of the matching network, the hybrid transformer attenuates the signal path from the analog transmitter drivers 308-1 and 308-2 to the analog receiver while the path from the single-ended antenna 312 to the analog receiver 306 is not affected.

In some embodiments, the signal received at the terminal, RX2, is used as main Rx signal in reader-mode to improve Rx sensitivity as the Rx signal dynamic range is greatly reduced. In some other embodiments, the signal path connected to the terminal, RX2, is used as "Clock Recovery Path" during active load modulation (ALM) when the communications device 102 is in card-emulation mode. In these embodiments, the analog receiver 306 is used to recover the clock from the counterpart communications device 104. Due to the high output power created by the analog transmitter drivers 308-1, 308-2, the Rx signal can be interfered by signals from the analog transmitter drivers. In a matching network that does not provide signal isolation between the transmitter and the antenna, the transmitter power has to be limited, which in turn limits the achievable communication distance. In the embodiment depicted in FIG. 3, the hybrid transformer separates the analog receiver 306 of the communications device from the analog transmitter drivers 308-1, 308-2 of the communications device because the analog receiver and the analog transmitter drivers are connected to different ports of the hybrid transformer. Because the analog receiver is separated from the analog transmitter drivers by the hybrid transformer, signal isolation between the analog transmitter drivers and the analog receiver is improved. Consequently, the transmitter carrier interference with the reception of an RF signal at the analog receiver can be attenuated. Because of the signal isolation between the analog transmitter drivers to the RX2 path, more transmitter power (e.g., full power) can be used with the matching network while still maintaining an adequate receiver sensitivity at the analog receiver. Consequently, compared to a matching network that does not provide signal isolation between the transmitter and the antenna, the matching network in FIG. 3 allows full transmitter power to be used, which results in greater communications distance.

The matching network 310 depicted in FIG. 3 is one possible embodiment of the matching network 110 depicted in FIG. 1. However, the matching network depicted in FIG. 1 is not limited to the embodiment shown in FIG. 3. For example, instead of the differential transmitter driver circuit 328, which includes the analog transmitter drivers 308-1 and 308-2, a single-ended transmitter driver is connected to the primary coil 320 of the hybrid transformer 316. In some embodiments, instead of the single-ended antenna, a differential antenna may be used with the matching network, for example, by connecting to the ports, P3 and P4, of the matching network.

Figure 4:
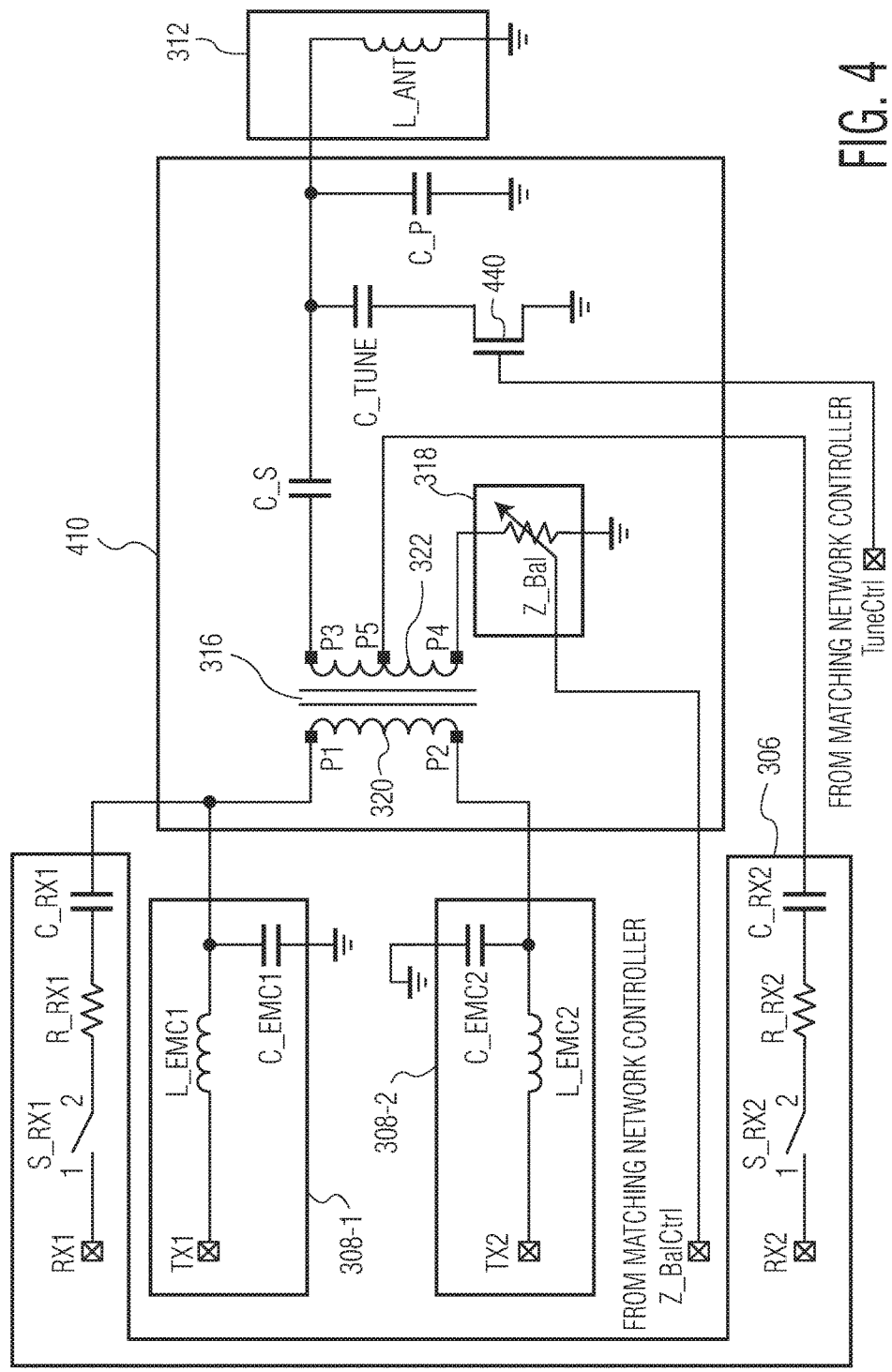
FIG. 4 depicts another embodiment of a matching network that can be used with the matching network controller of the communications device of FIG. 1.

FIG. 4 depicts another embodiment of a matching network 410 that can be used with the matching network controller 114 of the communications device 102 of FIG. 1. The difference between the matching network 410 depicted in FIG. 4 and the matching network 310 depicted in FIG. 3 is that a switchable capacitor, "C_TUNE," is connected between the tunable capacitors, C_S, C_P, and is controlled by a MOS transistor 440. The MOS transistor is controlled by the tuning signal TUNE_CTRL (e.g., from the matching network controller 114) to switch on or off the switchable capacitor, C_TUNE. In some embodiments, the switchable capacitor, C_TUNE, is implemented as a capacitor bank that can be switched on or off by the MOS transistor.

Figure 5:
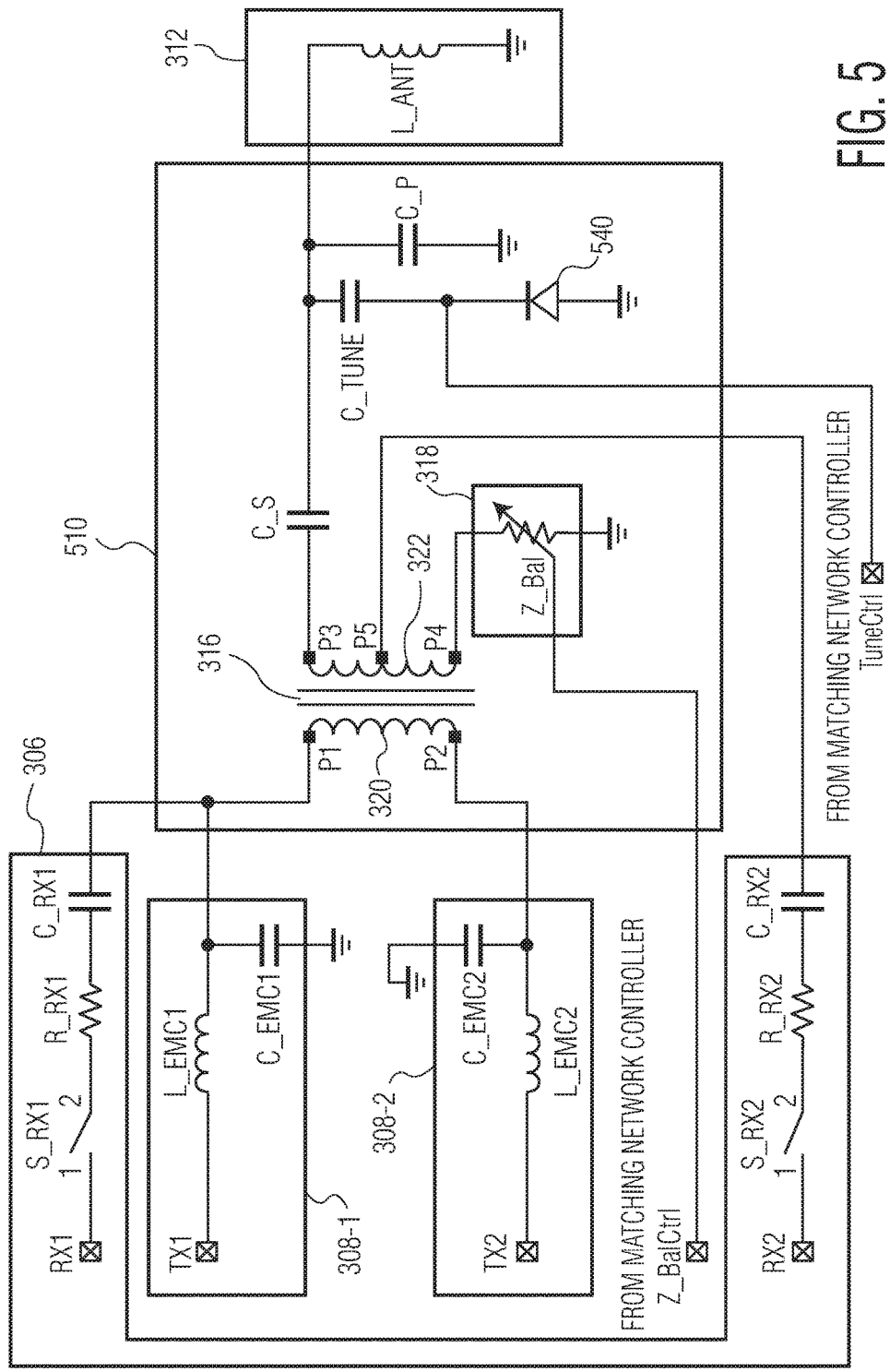
FIG. 5 depicts another embodiment of a matching network that can be used with the matching network controller of the communications device of FIG. 1.

FIG. 5 depicts another embodiment of a matching network 510 that can be used with the matching network controller 114 of the communications device 102 of FIG. 1. The difference between the matching network 510 depicted in FIG. 5 and the matching network 410 depicted in FIG. 4 is that the switchable capacitor, C_TUNE, is connected between the tunable capacitors, C_S, C_P, and is controlled by a diode 540. The anode of the diode is connected to ground while the cathode of the diode is connected to the switchable capacitor, C_TUNE. The diode is controlled by the tuning signal TUNE_CTRL to switch on or off the switchable capacitor, C_TUNE. In some embodiments, the switchable capacitor, C_TUNE, is implemented as a capacitor bank that can be switched on or off by the diode.

Figure 6:
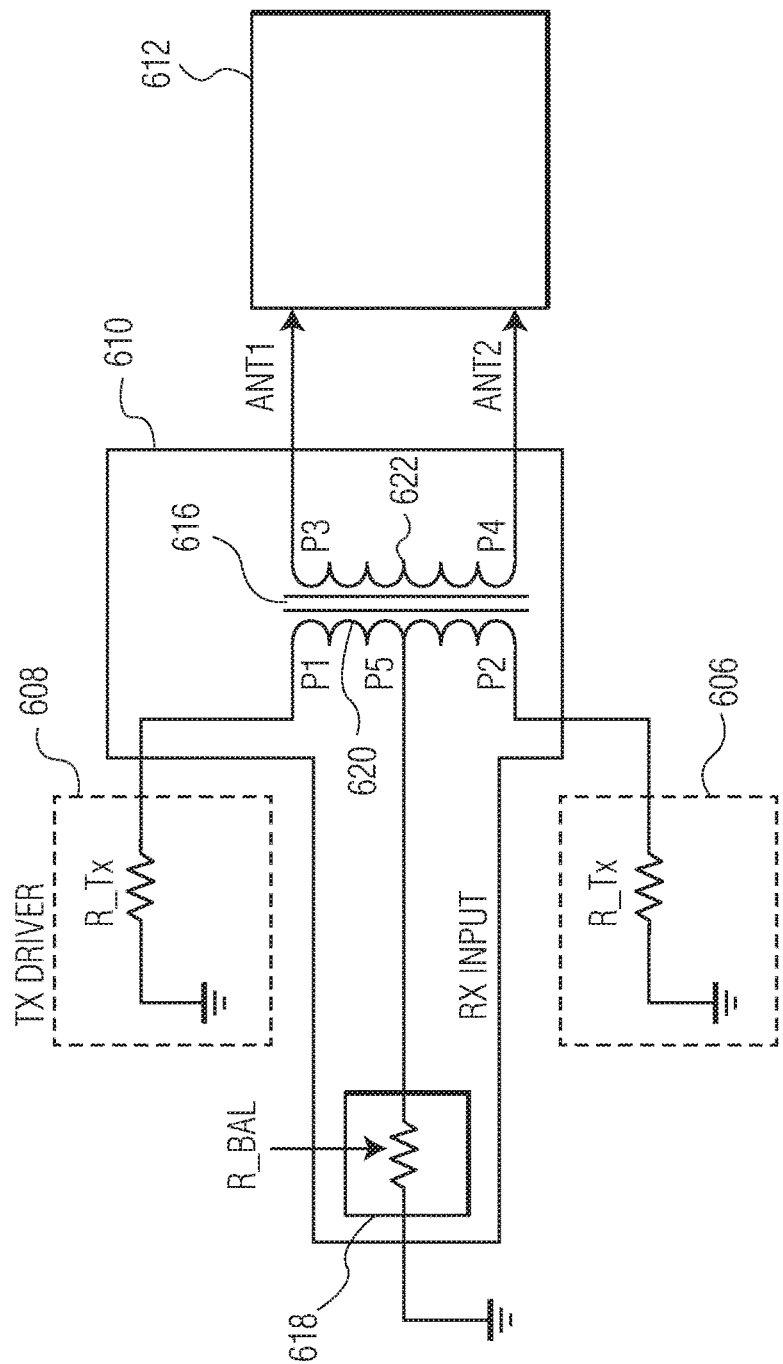
FIG. 6 depicts an embodiment of a matching network that can be used with the matching network controller of the communications device of FIG. 1 and a differential antenna.

FIG. 6 depicts an embodiment of a matching network 610 that can be used with the matching network controller 114 of the communications device 102 of FIG. 1 and a differential antenna 612. In the embodiment depicted in FIG. 6, the matching network includes a hybrid transformer 616 that includes a primary coil 620 and a secondary coil 622 that have five ports or terminals, "P1," "P2," "P3," "P4," and "P5." An analog transmitter driver 608, an analog receiver 606, and an adjustable impedance unit 618 are connected to the primary coil of the hybrid transformer. Specifically, the analog transmitter driver 608, which is represented by a resistor, "R_Tx," is connected to the port, P1, of the primary coil. The analog receiver 606, which is represented by a resistor, "R_Rx," is connected to the port, P2, of the primary coil. The adjustable impedance unit, which is represented by an adjustable resistor, "R_Bal," is connected to the port, P5, of the hybrid transformer, and is controlled by a tuning control signal, Tune_Ctrl, from the matching network controller 114 (depicted in FIG. 1). In some embodiments, the port, P5, is the center tap of the primary coil to maximize isolation from the analog transmitter drivers 208-1 and 208-2 to the analog receiver 206. In other embodiments, the port, P5, is not the center tap of the primary coil, which can be used to optimize the gain between the antenna and the analog receiver 206. The differential antenna is connected to the secondary coil of the hybrid transformer. Specially, a first antenna is connected to the port, P3, of the hybrid transformer and a second antenna is connected to the port, P4, of the hybrid transformer. Due to the high output power created by the analog transmitter drivers, the Rx signal can be interfered by signals from the analog transmitter drivers. In a matching network that does not provide signal isolation between the transmitter and the antenna, the transmitter power has to be limited, which in turn limits the achievable communication distance. In the embodiment depicted in FIG. 6, the hybrid transformer separates the analog receiver 606 of the communications device from the analog transmitter driver 608 of the communications device because the analog receiver and the analog transmitter driver are connected to different ports of the hybrid transformer. Because the analog receiver is separated from the analog transmitter driver by the hybrid transformer, signal isolation between the analog transmitter driver and the analog receiver is improved. Consequently, the transmitter carrier interference with the reception of an RF signal at the analog receiver can be attenuated. Because of the signal isolation between the analog transmitter driver and the analog receiver, more transmitter power (e.g., full power) can be used with the matching network while still maintaining an adequate receiver sensitivity at the analog receiver. Consequently, compared to a matching network that does not provide signal isolation between the transmitter and the antenna, the matching network in FIG. 6 allows full transmitter power to be used, which results in greater communications distance. In an example operation of the matching network, the hybrid transformer attenuates the signal path from the analog transmitter driver to the analog receiver while the path from the differential antenna to the analog receiver is not affected.

The matching network 610 depicted in FIG. 6 is one possible embodiment of the matching network 110 depicted in FIG. 1. However, the matching network depicted in FIG. 1 is not limited to the embodiment shown in FIG. 6. For example, although the adjustable impedance unit 618 is implemented as the adjustable resistor, R_Bal, in the embodiment depicted in FIG. 6, in other embodiments, the adjustable impedance unit is implemented as a combination of a resistive unit and a capacitive unit that exhibits a complex impedance. In another example, instead of the differential antenna 612, which includes the analog transmitter drivers 654-1 and 642-2, a single-ended antenna is connected to the second coil 622 of the hybrid transformer 216.

Figure 7:
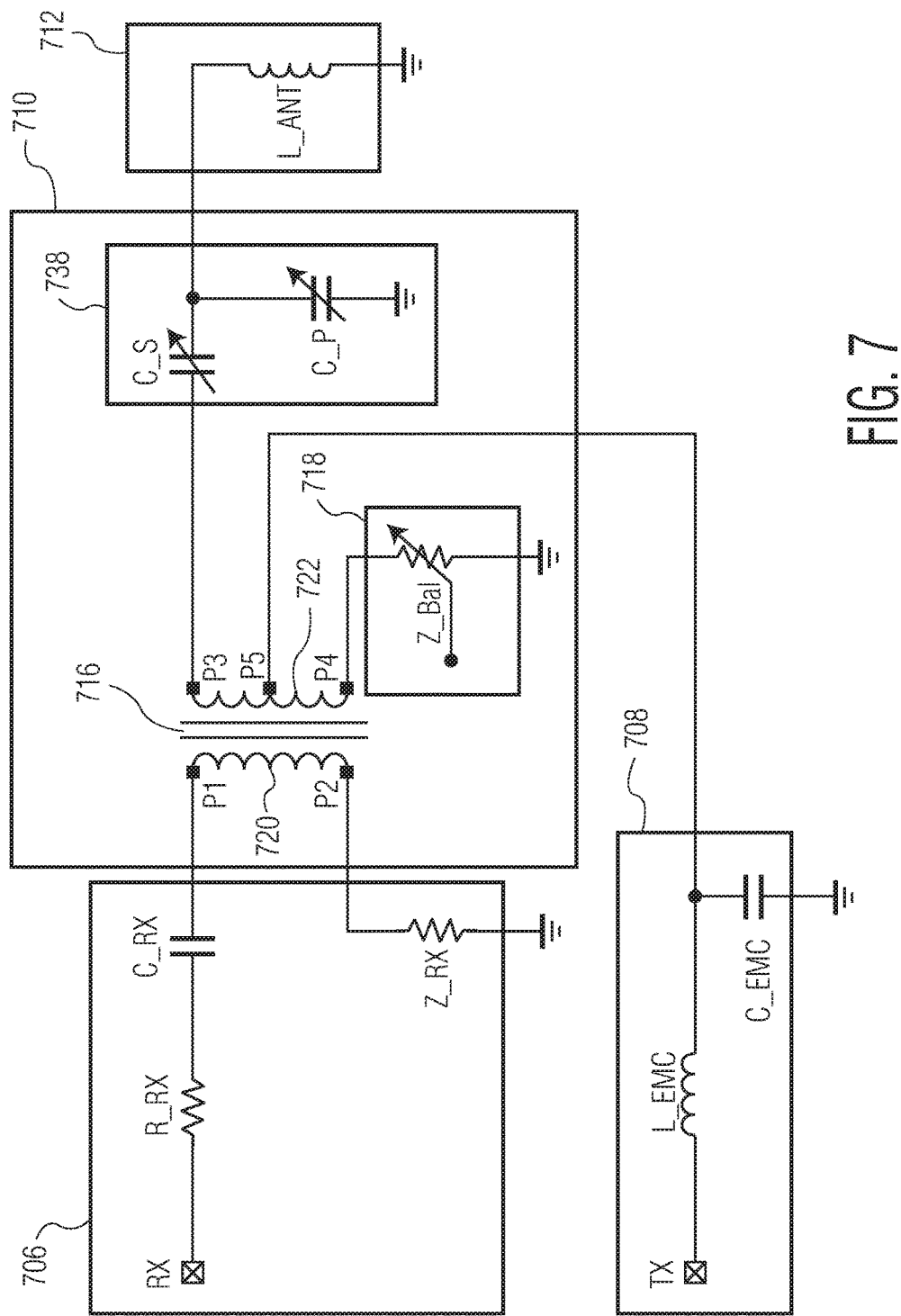
FIG. 7 depicts an embodiment of a matching network that can be used with the matching network controller of the communications device of FIG. 1 and a differential analog receiver of the communications device.

FIG. 7 depicts an embodiment of a matching network 610 that can be used with the matching network controller 114 of the communications device 102 of FIG. 1 and a differential analog receiver 706. In the embodiment depicted in FIG. 7, the matching network includes a hybrid transformer 716 that includes a primary coil 720 and a secondary coil 722 that have five ports or terminals, "P1," "P2," "P3," "P4," and "P5." The differential analog receiver is connected to the primary coil of the hybrid transformer. Specifically, a first analog receiver 746-1, which is represented by a resistor, "R_Tx," and a capacitor, "C_Rx," is connected to the port, P1, of the primary coil. A second analog receiver 746-2, which is represented by an impedance, "Z_Rx," is connected to the port, P2, of the primary coil. A single-ended antenna 712, an analog transmitter driver 208, and an adjustable impedance unit 218 are connected to the secondary coil of the hybrid transformer. Specially, the single-ended antenna, which is represented by an inductor, "L_ANT," is connected to the port, P3, of the hybrid transformer via a capacitive divider of the matching network. The capacitive divider includes adjustable capacitors, "C_S," and, "C_P," whose capacitance values can be adjusted by the matching network controller 114 (depicted in FIG. 1), for example, to compensate impedance mismatch due to the coupling condition between the communications device 102 and the counterpart communications device 104. The adjustable impedance unit, which is represented by an adjustable impedance, "Z_Bal," is connected to the port, P4, of the hybrid transformer, and is controlled by the matching network controller 114 (depicted in FIG. 1). The analog transmitter driver, which is represented by a combination of an inductor, "L_EMC," and a capacitor, "C_EMC," is connected to the port, P5, of the hybrid transformer. In some embodiments, the port, P5, is the center tap of the secondary coil to maximize isolation from the analog receivers 746-1 and 746-2 to the analog receiver 406. In other embodiments, the port, P5, is not the center tap of the secondary coil, which can be used to optimize the gain between the antenna and the analog receivers. The matching network 710 depicted in FIG. 7 is one possible embodiment of the matching network 110 depicted in FIG. 1. However, the matching network depicted in FIG. 1 is not limited to the embodiment shown in FIG. 7.

Figure 8:
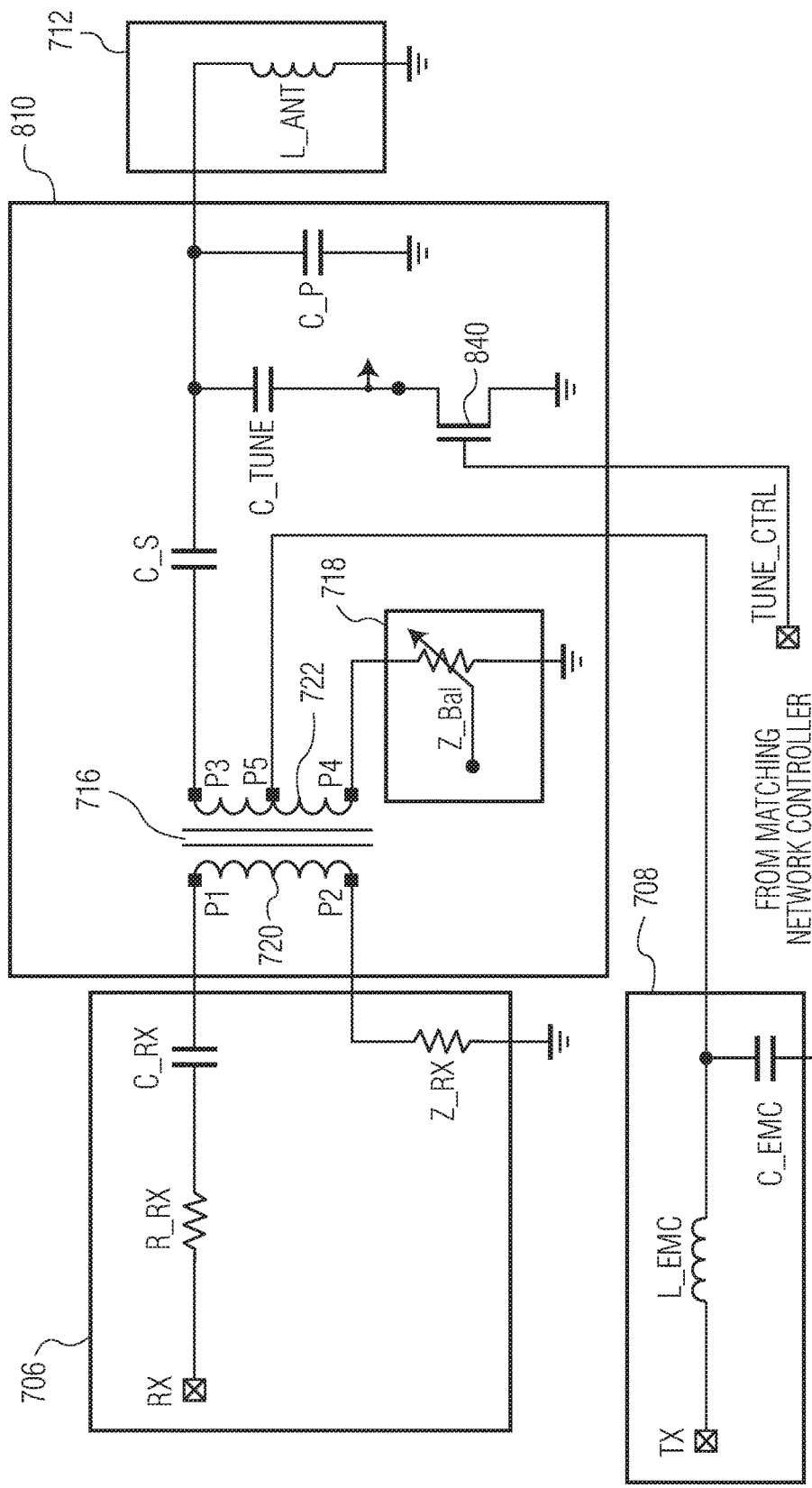
FIG. 8 depicts another embodiment of a matching network that can be used with the matching network controller of the communications device of FIG. 1.

FIG. 8 depicts another embodiment of a matching network 810 that can be used with the matching network controller 114 of the communications device 102 of FIG. 1. The difference between the matching network 810 depicted in FIG. 8 and the matching network 710 depicted in FIG. 7 is that a switchable capacitor, "C_TUNE," is connected between the tunable capacitors, C_S, C_P, and is controlled by a MOS transistor 840. The MOS transistor is controlled by the tuning signal TUNE_CTRL to switch on or off the switchable capacitor, C_TUNE. In some embodiments, the switchable capacitor, C_TUNE, is implemented as a capacitor bank that can be switched on or off by the MOS transistor.

Figure 9:
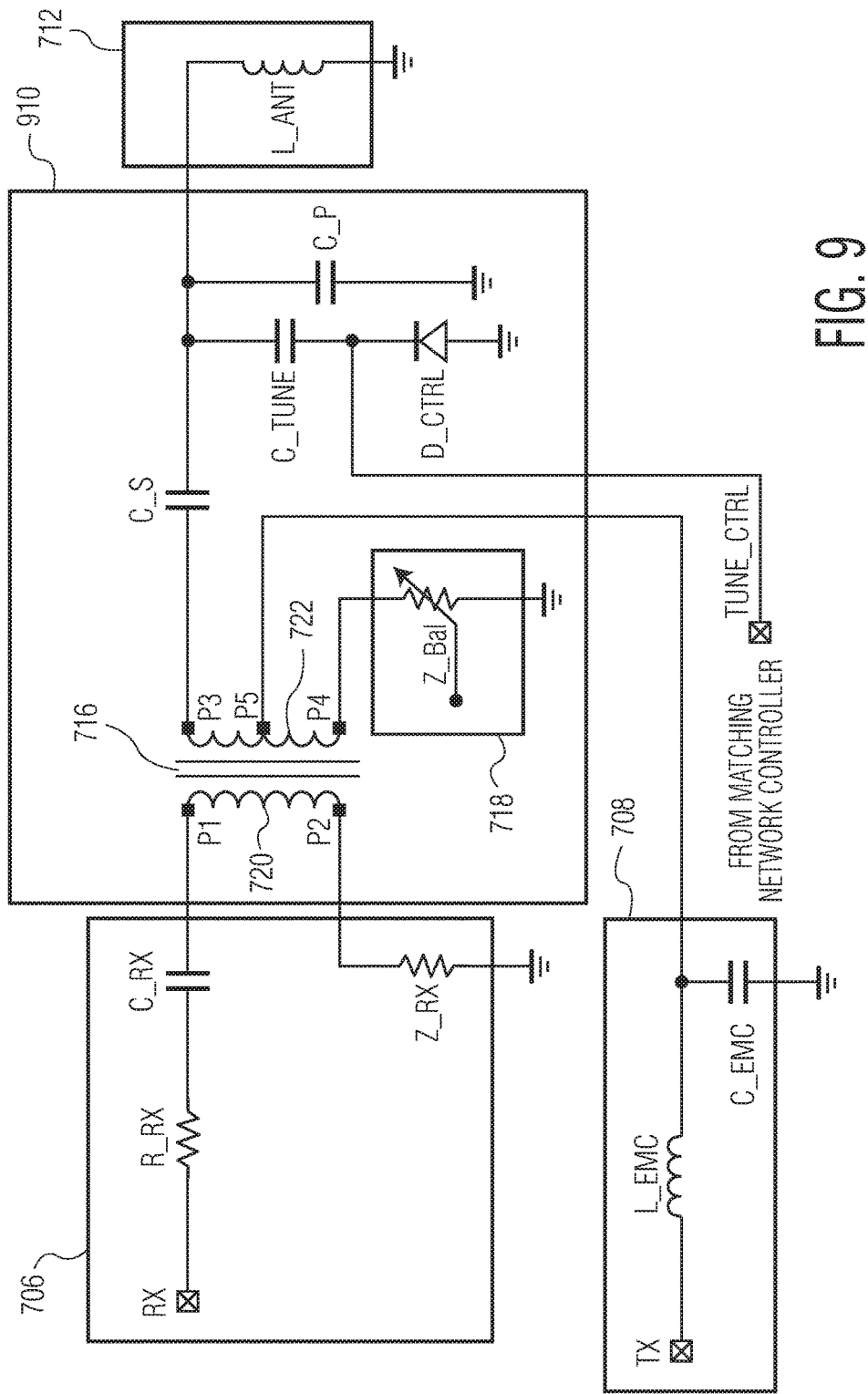
FIG. 9 depicts another embodiment of a matching network that can be used with the matching network controller of the communications device of FIG. 1.

FIG. 9 depicts another embodiment of a matching network 910 that can be used with the matching network controller 114 of the communications device 102 of FIG. 1. The difference between the matching network 910 depicted in FIG. 9 and the matching network 710 depicted in FIG. 7 is that the switchable capacitor, C_TUNE, is connected between the tunable capacitors, C_S, C_P, and is controlled by a diode, "D_CTRL." The anode of the diode, D_CTRL, is connected to ground while the cathode of the diode, D_CTRL, is connected to the switchable capacitor, C_TUNE. The diode, D_CTRL, is controlled by the tuning signal TUNE_CTRL to switch on or off the switchable capacitor, C_TUNE. In some embodiments, the switchable capacitor, C_TUNE, is implemented as a capacitor bank that can be switched on or off by the diode, D_CTRL.

Figure 10:
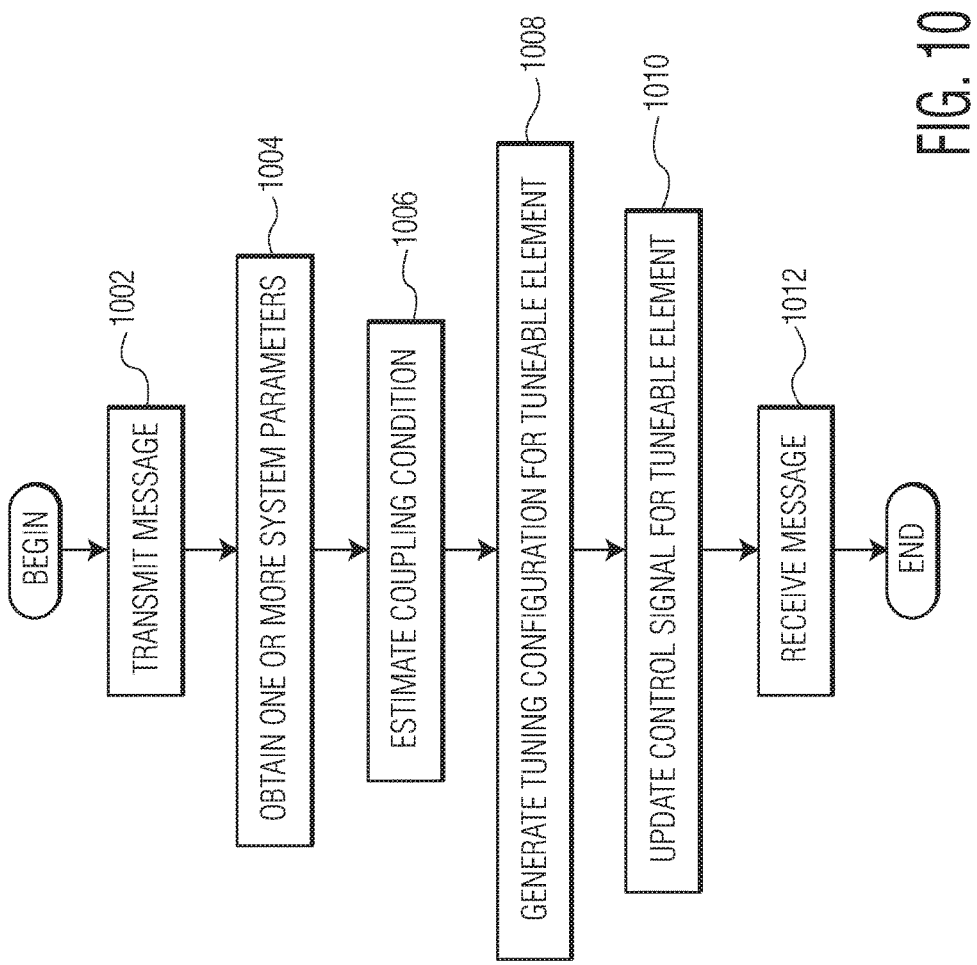
FIG. 10 is a process flow diagram of a method for operating a communications device that communicates via inductive coupling in accordance with an embodiment of the invention.

FIG. 10 is a process flow diagram of a method for operating a communications device that communicates via inductive coupling in accordance with an embodiment of the invention. At block 1002, a message is transmitted from a communications device to a counterpart communications device. At block 1004, one or more system parameters are obtained at the communications device. For example, the transmitter current at an analog transmitter driver of the communications device, the signal magnitude of a signal received at an analog receiver of the communications device, and/or the phase information of a signal received at an analog receiver of the communications device can be obtained. At block 1006, the coupling condition between the communications device and the counterpart communications device is estimated. At block 1008, a tuning configuration for a tunable element connected to a hybrid transformer of a matching network of the communications device is generated. At block 1010, a control signal for the tunable element is updated. Consequently, the tunable element is adjusted. At block 1012, a message is received at the communications device from the counterpart communications device. The communications device may be the same as or similar to the communications device 102 depicted in FIG. 1. The communications counterpart device may be the same as or similar to the communications counterpart device 104 depicted in FIG. 1. The analog transmitter driver may be the same as or similar to the analog transmitter driver 108 depicted in FIG. 1, the analog transmitter driver 208 depicted in FIG. 2, the analog transmitter driver 308 depicted in FIGS. 3, 4, and 5, the analog transmitter driver 608 depicted in FIG. 6, and/or the analog transmitter driver 708 depicted in FIGS. 7, 8, and 9. The analog receiver may be the same as or similar to the analog receiver 106 depicted in FIG. 1, the analog receiver 206 depicted in FIG. 2, the analog receiver 306 depicted in FIGS. 3, 4, and 5, the analog receiver 606 depicted in FIG. 6, and/or the analog receiver 706 depicted in FIGS. 7, 8, and 9. The hybrid transformer may be the same as or similar to the hybrid transformer 116 depicted in FIG. 1, the hybrid transformer 216 depicted in FIG. 2, the hybrid transformer 316 depicted in FIGS. 3, 4, and 5, the hybrid transformer 616 depicted in FIG. 6, and/or the hybrid transformer 716 depicted in FIGS. 7, 8, and 9. The matching network may be the same as or similar to the matching network 110 depicted in FIG. 1, the matching network 210 depicted in FIG. 2, the matching network 310 depicted in FIG. 3, the matching network 410 depicted in FIG. 4, the matching network 510 depicted in FIG. 5, the matching network 610 depicted in FIG. 6, the matching network 710 depicted in FIG. 7, the matching network 810 depicted in FIG. 8, and/or the matching network 910 depicted in FIG. 9. The tunable element may be the same as or similar to the adjustable impedance unit 118 depicted in FIG. 1, the adjustable impedance unit 218 depicted in FIG. 2, the adjustable impedance unit 318 and/or the capacitive divider 338 depicted in FIG. 3, the adjustable impedance unit 318, the capacitive divider 338, the switchable capacitor, C_TUNE, and/or the MOS transistor 440 depicted in FIG. 4, the adjustable impedance unit 318, the capacitive divider 338, the switchable capacitor, C_TUNE, and/or the diode 540 depicted in FIG. 5, the adjustable impedance unit 618 depicted in FIG. 6, the adjustable impedance unit 718 and/or the capacitive divider 738 depicted in FIG. 7, the adjustable impedance unit 718, the capacitive divider 738, the switchable capacitor, C_TUNE, and/or the MOS transistor 840 depicted in FIG. 8, and/or the adjustable impedance unit 718, the capacitive divider 738, the switchable capacitor, C_TUNE, and/or the diode 940 depicted in FIG. 9.

Figure 11:
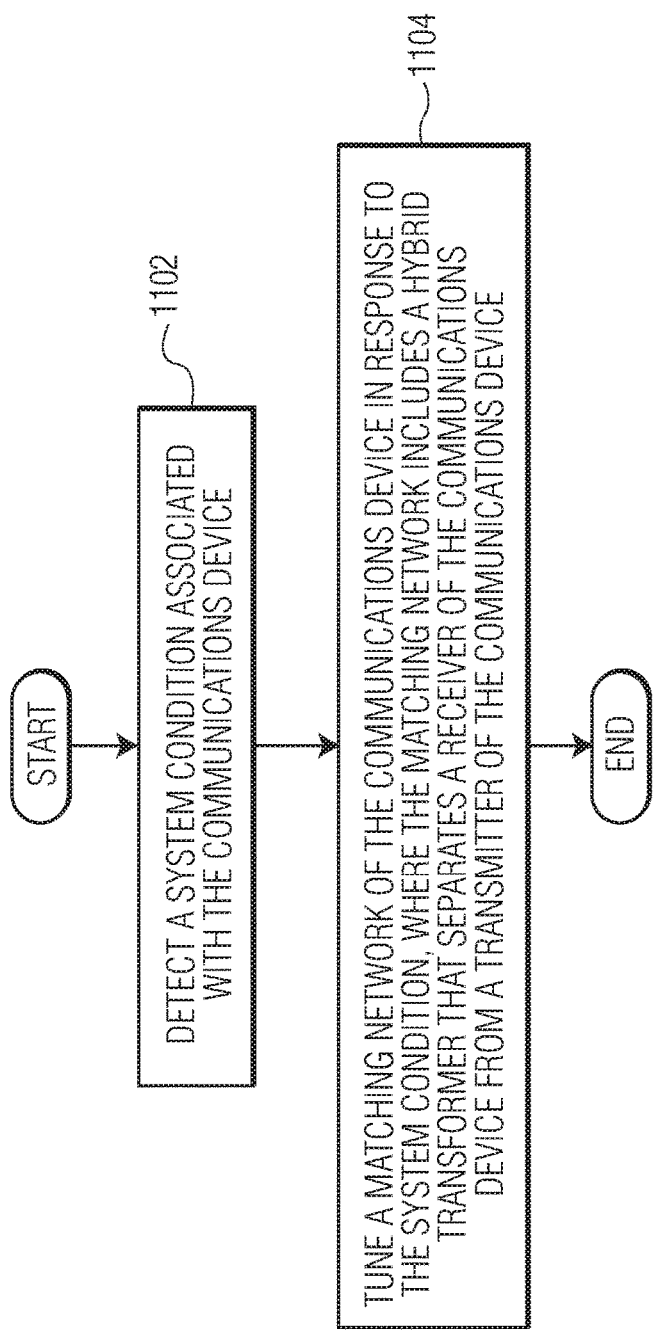
FIG. 11 is a process flow diagram of a method for operating a communications device that communicates via inductive coupling in accordance with another embodiment of the invention.

FIG. 11 is a process flow diagram that illustrates a method for operating a communications device that communicates via inductive coupling in accordance with another embodiment of the invention. At block 1102, a system condition associated with the communications device is detected. At block 1104, a matching network of the communications device is tuned in response to the system condition, where the matching network includes a hybrid transformer that separates a receiver of the communications device from a transmitter of the communications device. The communications device may be the same as or similar to the communications device 102 depicted in FIG. 1. The hybrid transformer may be the same as or similar to the hybrid transformer 116 depicted in FIG. 1, the hybrid transformer 216 depicted in FIG. 2, the hybrid transformer 316 depicted in FIGS. 3, 4, and 5, the hybrid transformer 616 depicted in FIG. 6, and/or the hybrid transformer 716 depicted in FIGS. 7, 8, and 9. The matching network may be the same as or similar to the matching network 110 depicted in FIG. 1, the matching network 210 depicted in FIG. 2, the matching network 310 depicted in FIG. 3, the matching network 410 depicted in FIG. 4, the matching network 510 depicted in FIG. 5, the matching network 610 depicted in FIG. 6, the matching network 710 depicted in FIG. 7, the matching network 810 depicted in FIG. 8, and/or the matching network 910 depicted in FIG. 9.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for operating a communications device that communicates via inductive coupling, the method comprising:
   detecting a system condition associated with the communications device; and
   tuning a matching network of the communications device in response to the system condition, wherein the communications device comprises:
   an analog transmitter driver;
   an analog receiver;
   an antenna;
   a matching network controller; and
   the matching network;
      the matching network that including:
      a hybrid transformer including a primary coil and a secondary coil, wherein the hybrid transformer separates the analog receiver of the communications device from analog transmitter driver of the communications device; and
      an impedance unit connected to the hybrid transformer, wherein the impedance unit is adjustable in response to a system condition associated with the communications device; and
      the matching network controller including a system condition detector configured to detect the system condition associated with the communications device and a matching network tuner configured to tune the matching network of the communications device in response to the system condition;
   wherein the hybrid transformer has first, second, third, fourth, and fifth ports, the first and second ports being connected to opposite ends of the primary coil and connected to the analog transmitter driver, the third port being connected to a first end of the secondary coil and connected to the antenna, the fourth port being connected to a second end of the secondary coil and connected to the impedance unit, the fifth port being connected at a center tap of the second coil and connected to the analog receiver.

2. The method of claim 1, wherein tuning the matching network of the communications device in response to the system condition comprises tuning the impedance unit in response to the system condition.

3. The method of claim 2, wherein tuning the impedance unit comprises tuning the impedance unit to compensate for a mismatch of impedance at the hybrid transformer in response to the system condition.

4. The method of claim 2, wherein tuning the impedance unit comprises controlling a semiconductor device in response to the system condition.

5. The method of claim 2, wherein the system condition comprises a coupling condition associated with the communications device.

6. The method of claim 5, wherein detecting the coupling condition associated with the communications device comprises:
   obtaining one or more system parameters associated with the communications device; and
   deriving the coupling condition associated with the communications device from the one or more system parameters.

7. The method of claim 6, wherein the one or more system parameters comprise a transmitter current at the analog transmitter driver of the communications device, a signal magnitude of a signal received at the analog receiver of the communications device or phase information of a signal received the an analog receiver of the communications device.

8. A communications device that communicates via inductive coupling, the communications device comprising:
   an analog transmitter driver;
   an analog receiver;
   an antenna;
   a matching network that includes:
      a hybrid transformer including a primary coil and a secondary coil, wherein the hybrid transformer separates the analog receiver of the communications device from analog transmitter driver of the communications device; and
      an impedance unit connected to the hybrid transformer, wherein the impedance unit is adjustable in response to a system condition associated with the communications device; and
   a matching network controller including a system condition detector configured to detect the system condition associated with the communications device and a matching network tuner configured to tune the matching network of the communications device in response to the system condition;
   wherein the hybrid transformer has first, second, third, fourth, and fifth ports, the first and second ports being connected to opposite ends of the primary coil and connected to the analog transmitter driver, the third port being connected to a first end of the secondary coil and connected to the antenna, the fourth port being connected to a second end of the secondary coil and connected to the impedance unit, the fifth port being connected at a center tap of the second coil and connected to the analog receiver.

9. The communications device of claim 8, wherein the analog receiver is a differential receiver and wherein the analog receiver is also connected to the first port of the hybrid transformer.

10. The communications device of claim 8, wherein: a first switch is located between the first port of the hybrid transformer and a first terminal of the differential analog receiver; and a second switch is located between the fifth port of the hybrid transformer and a second terminal of the differential analog receiver.

* * * * *